United States Patent
Snyder (10) Patent No.: US 8,041,901 B2
(45) Date of Patent: Oct. 18, 2011

(54) PERFORMANCE MONITORING DEVICE AND METHOD THEREOF

(75) Inventor: Michael D. Snyder, Austin, TX (US)

(73) Assignee: Freescale Semiconductor, Inc., Austin, TX (US)

(*) Notice: Subject to any disclaimer, the term of this patent is extended or adjusted under 35 U.S.C. 154(b) by 755 days.

(21) Appl. No.: 11/682,058

(22) Filed: Mar. 5, 2007

(65) Prior Publication Data
US 2008/0222382 A1 Sep. 11, 2008

(51) Int. Cl.
*G06F 12/00* (2006.01)
(52) U.S. Cl. ........ 711/154; 711/100; 711/200; 717/127; 717/131
(58) Field of Classification Search .......... 711/100, 711/154, 200; 717/127, 130–131
See application file for complete search history.

(56) References Cited

U.S. PATENT DOCUMENTS

| 5,446,876 A | 8/1995 | Levine et al. |
| 5,581,482 A | 12/1996 | Wiedenman et al. |
| 5,657,253 A | 8/1997 | Dreyer et al. |
| 2005/0155021 A1* | 7/2005 | DeWitt et al. ............ 717/130 |

* cited by examiner

*Primary Examiner* — Jasmine Song (57) ABSTRACT

A performance monitoring device and method are disclosed. The device monitors performance events of a processor. A counter is adjusted in response to the occurrence of a particular performance event. The counter can be associated with a particular instruction address range, or a data address range, so that the counter is adjusted only when the performance event occurs at the instruction address range or the data address range. Accordingly, the information stored in the counter can be analyzed to determine if a particular instruction address range or data address range results in a particular performance event. Multiple counters, each associated with a different performance event, instruction address range, or data address range, can be employed to allow for a detailed analysis of which portions of a program lead to particular performance events.

20 Claims, 5 Drawing Sheets

PERFORMANCE MONITORING DEVICE AND METHOD THEREOF

FIELD OF THE DISCLOSURE

The present application relates to data processing devices and more particularly to performance monitoring in data processing devices.

BACKGROUND

Data processors typically execute a series of operations to execute instructions. For example, execution of a single instruction can result in access to an instruction cache, a translation lookaside buffer (TLB), external memory, a data cache, and other portions of the data processor. Each operation can result in one or more performance events, such as a cache miss, a TLB access, and the like. In addition, performance of the data processor can typically be improved by increasing the efficiency of execution of operations resulting from a series of instructions. For example, a data processor can be made more efficient by increasing the number of times that a series of instructions is able to retrieve data from a local cache rather than external memory. Accordingly, it can be useful for programmers to know which instructions cause particular performance events. However, because each task of the data processor can require the execution of thousands or even millions of instructions, it can be difficult to determine which performance events occur during execution of individual instructions. Accordingly an improved performance monitoring technique is needed.

DETAILED DESCRIPTION

A performance monitoring device and method are disclosed. The device monitors performance events of a processor. A counter is adjusted in response to the occurrence of a particular performance event. The counter can be associated with a particular criterion, such as an instruction address range, a data address range or both, so that the counter is adjusted only when the performance event is associated with the instruction address range or data address range. Accordingly, the information stored in the counter can be analyzed to determine if a particular instruction address range or data address range results in a particular performance event. Multiple counters, each associated with a different performance event, instruction address range, or data address range, can be employed to allow for a detailed analysis of which portions of a series of instructions lead to particular performance events. This analysis can be used to improve program efficiency or the efficiency of a data processor design.

Figure 1:
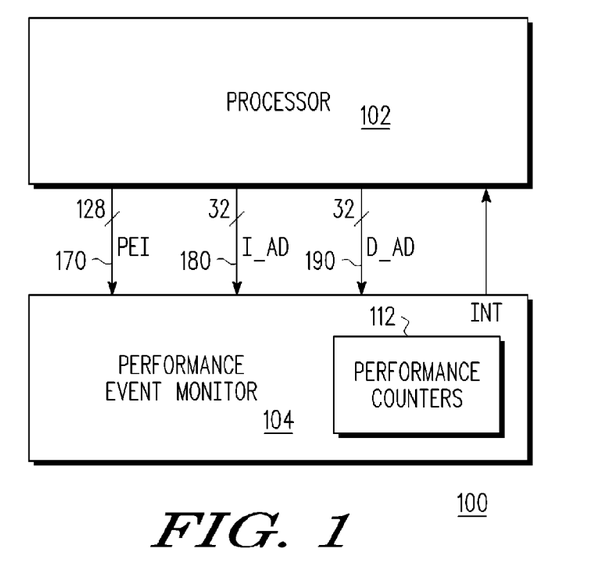
FIG. 1 is a block diagram of a particular embodiment of a data processing device.

Referring to FIG. 1, a block diagram of a particular embodiment of a data processing device 100 is illustrated. The data processing device 100 can be implemented as a single integrated circuit device. Alternatively each module of the data processing device 100 can be implemented in a separate integrated circuit device.

The data processing device 100 includes a processor 102 and a performance event monitor 104. The processor 102 is connected to the performance event monitor 104 through a number of data buses, including a performance event indicator data bus 170 labeled "PEI", an instruction address data bus 180 labeled "I_AD", and a data address data bus 190 labeled "D_AD." In addition, an output ("INT") of the performance event monitor 104 is connected to an input of the processor 102.

The processor 102 can be a data processor e.g. a microprocessor, microcontroller, and the like, configured to execute instructions that result in performance events, such as cache hits, cache misses, TLB hits, and the like. An address, such as an instruction address, a data address, or both, is associated with each instruction and therefore is associated with any performance events that result from the instruction. The processor 102 is configured to indicate that a performance event has occurred by providing a performance event code at the PEI bus 170, and by providing the instruction address and data address associated with the performance event at the I_AD bus 180 and D_AD bus 190, respectively.

The performance event monitor 104 includes a set of performance counters 112. The performance event monitor 104 is configured to decode a performance event code provided via the PEI bus 170 and to identify whether one or more of the performance counters 112 is associated with the performance event type indicated by the event code. In a particular embodiment, the performance counters 112 include at least one counter for each performance event type that can be indicated on the PEI bus 170. In another particular embodiment, there are more possible event types than performance counters, and each of the performance counters 112 can be individually configured to be associated with one or more performance event type.

The performance event monitor 104 is configured to adjust counters associated with the indicated performance event type depending on the relationship between an instruction address at the I_AD bus 180, the data address at the D_AD bus 190, and one or more address ranges. For example, the performance event monitor 104 can be configured to adjust a specific performance counter if the instruction address falls within a first address range and the data address falls within a second address range. In addition, the performance event monitor 104 can be configured to provide an interrupt signal at the output INT in response to one of the performance counters 112 exceeding a threshold.

During operation, the processor 102 executes instructions and identifies performance events resulting from execution of those instructions. In response to identifying a performance event, the processor 102 communicates the type of performance event to the performance event monitor 104, together with the instruction address or data address associated with the performance event.

The performance event monitor 104 identifies which of the performance counters 112 are associated with the communicated performance event type and adjusts each identified counter based on the relationship between an address range associated with each counter and the instruction address or the data address. Accordingly, after a set of instructions has be executed, each of the performance counters 112 can indicate the number of one type of performance event that occurred in response to execution of instructions associated with an address range. Thus, the performance event monitor 104 can be used to record performance events caused by instructions associated with a particular instruction address range, or particular data address range, and not record performance events associated with addresses outside the defined address ranges. This information can be use to analyze the performance or for a particular instruction range or data address range. This analysis can be used to improve the efficiency of the analyzed instructions.

The performance event monitor 104 monitors the performance counters 112 to determine if one or more of the counters exceed a threshold. The threshold can be stored in a programmable register (not shown) of the processor 102 and indicate a threshold number of performance events that will result in a debug operation at the processor 102. Accordingly, if the threshold is exceeded, the performance event monitor 104 can generate an interrupt signal at the INT output. In response, the processor 102 can initiate debug or other operations. Such debug operations can include providing the contents of the performance counters 112 to the processor 102 via a debug interface (not shown). This allows the contents of the performance counters to be analyzed by a programmer.

Figure 2:
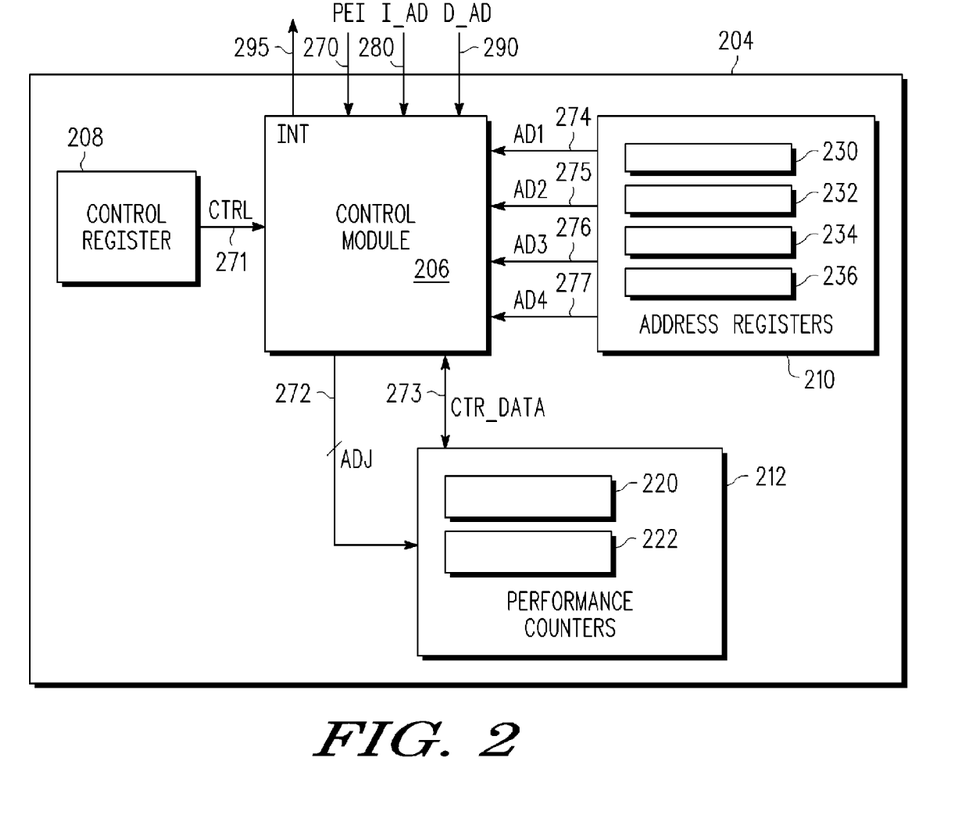
FIG. 2 is block diagram of a particular embodiment of a performance event monitor of the data processing device of FIG. 1.

Referring to FIG. 2, a block diagram of a particular embodiment of a performance event monitor 204, corresponding to, for example, performance event monitor 104 of FIG. 1, is illustrated. The performance event monitor 204 includes a control module 206, a control register 208, a set of address registers 210, and a set of performance counters 212. The set of address registers 210 include a plurality of address registers, including address registers 230, 232, 234, and 236 (address registers 230-236). Each of the address registers 230-236 stores a particular address or address range. The set of performance counters 212 includes a number of performance counters, including performance counter 220 and performance counter 222. The control register 208 includes an output connected to a control bus 271 (CTRL). In addition, each of the address registers in the set of address registers 210 is connected to the control module 206 via an address bus, including address bus 274 (AD1), address bus 275 (AD2), address bus 276 (AD3), and address bus 277 (AD4). Further, the control module 206 includes an input connected to the CTRL bus 271 is connected to the set of performance counters 212 via a control bus 272 labeled "ADJ" and a data bus 273 labeled "CTR_DATA." In addition, the control module 206 includes inputs connected to the PEI bus 270, the I_AD bus 280, and the D_AD bus 290, as well as an output (INT) connected to the processor 102 (FIG. 1).

The control register 208 is configured to store control information, including information indicating adjustment criteria for each of the set of performance counters 212. For example, the control register 208 can identify the type of performance event and which of the address registers 230-236 of the set of address registers 210 is associated with a performance counter, as well as the match type for the counter. The match type indicates the relationship between the address range identified by the associated address register and the instruction address or data address that will result in adjustment of the counter. For example, the match type can indicate that a counter should be adjusted when a received address falls within an address range, when the received address exactly matches a particular address, when the received address falls outside the address range, and the like.

The control register 208 can provide other control information. For example the control register 208 can indicate whether performance monitoring is enabled, so that performance events are only monitored for particular programs, instruction sets, program threads, virtual processor, and the like, at the processor 102. Further, the control register 208 can indicate whether performance monitoring is enabled for particular performance counters. The control register 208 provides the control information via the CTRL bus 208.

The control module 206 is configured to receive control information from the CTRL bus and, based on the control information, determine whether performance event monitoring is enabled. If it is enabled, the control module 206 provides adjustment information on the ADJ bus based on the performance event indicator at the PEI bus 270, the addresses received on the I_AD bus 280 and D_AD bus 290, the configuration information received via the CTRL bus 208, and addresses or address ranges received via the AD1 bus 274, the AD2 bus 275, the AD3 bus 276, and the AD4 bus 277. The control module 206 determines the adjustment information by comparing the addresses at the I_AD bus 280 and D_AD bus 290 with the received address information according to the match type and other configuration information provided on the CTRL bus 208. In addition, the control module 206 is configured to receive counter data via the CTR_DATA bus 273 and determine if the counter data exceeds a threshold. If a threshold is exceeded the control module 206 provides an interrupt signal at the output INT.

During operation, the control module 206 receives a performance event type on the PEI bus 270, together with one or both of an associated instruction address on the I_AD bus 280 and an associated data address on the D_AD bus 290. The control module 206 compares the received addresses to the address ranges identified in the set of address registers 210. Based on the comparison results and the configuration data stored at the control register 208, the control module 206 determines which of the set of address registers 210 performance counters 212 is to be adjusted and provides the appropriate adjustment information via the ADJ bus 272 to adjust the identified counters. Adjusting a performance counter can include incrementing, decrementing, or otherwise changing the value stored in the performance counter.

For example, the control register 208 can indicate that the performance counter 220 should be adjusted when the instruction address of the received performance event type falls outside of the address range identified in address register 230. If the comparison at the control module 206 indicates that the instruction address at the I_AD bus 280 falls outside of the indicated address range, the control module 206 indicates to the performance counters 212 that the performance counter 220 should be adjusted. The control register 208 can also indicate that one of the performance counters 212 should be adjusted in response to the instruction address or the data address falling within one of a set of address ranges. Further, the control register 208 can indicate that multiple performance counters should be adjusted based on an instruction address or data address match.

The performance monitor 204 can record information for a variety of performance events, including but not limited to instruction processing performance events, such as instruction completion, micro-op completion, instructions fetched, micro-ops decoded, micro-ops completed in a given number of cycles, micro-ops decoded in a given number of cycles, micro-ops of a particular type completed (e.g. load type micro-ops completed); branch related performance events such as branch instructions completed, mispredicted branches, interrupts, mispredicts, phantom branches; memory access performance events such as translation events, cache hits, cache loads, load misses, address collisions, data MMU misses, MMU reloads, floating point stores requiring normalization or denormalization, address collisions, and the like.

Figure 3:
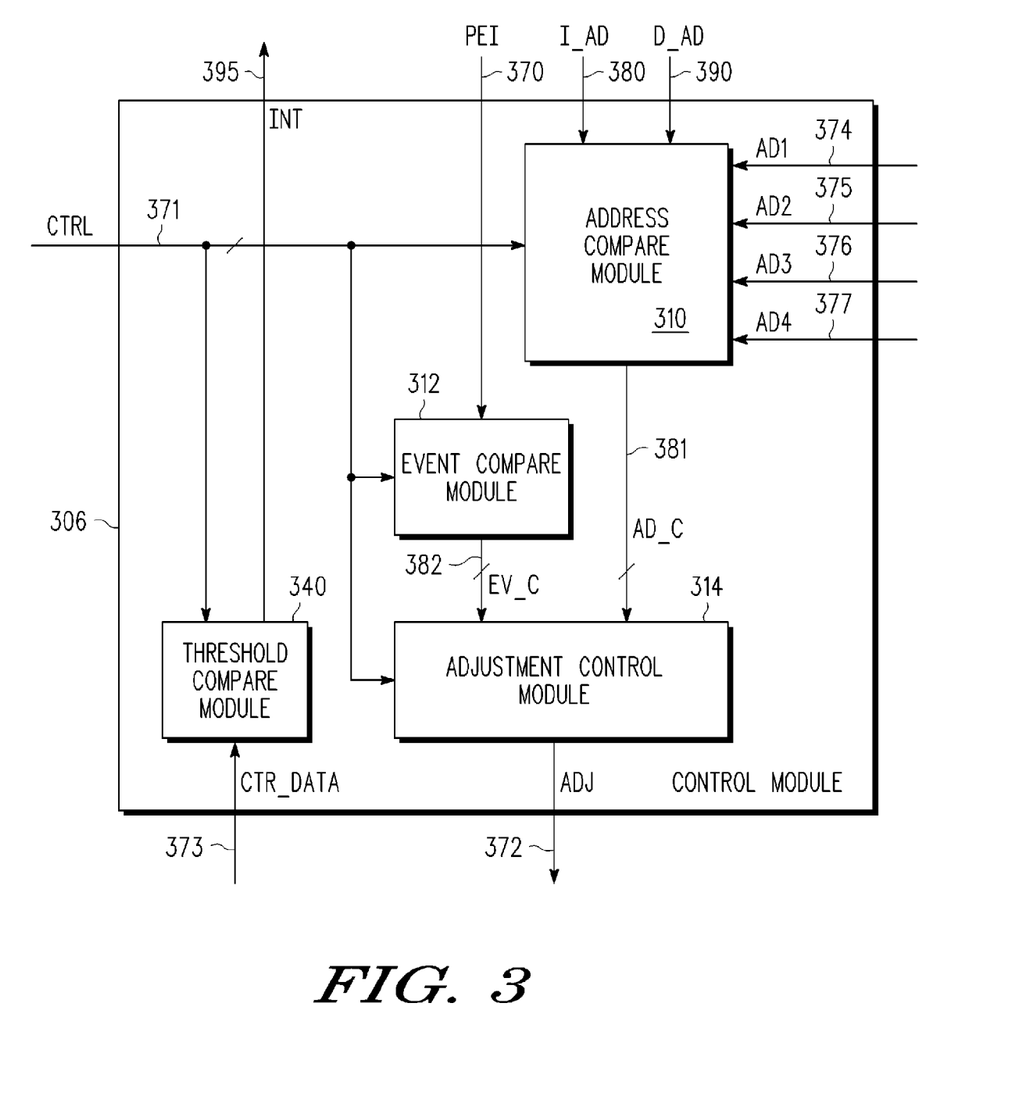
FIG. 3 is a block diagram of a particular embodiment of a control module of the performance event monitor of FIG. 2.

Referring to FIG. 3, a particular embodiment of a control module 306, corresponding to, for example, control module 206 of FIG. 2 is illustrated. The control module 306 includes an address compare module 310, an event compare module 312, a threshold compare module 340, and an adjustment control module 314. The address compare module 310 includes a inputs connected to the bus 374 (AD1), the bus 375 (AD2), the bus 376 (AD3), and the bus 377 (AD4), inputs connected to the I_AD bus 380 and D_AD bus 390, and an output connected to a bus 381 (AD_C). The event compare module 310 includes an input connected to the PEI bus 370, a control input connected to a CTRL bus 371, and a control output connected to a bus 382 (EV_C). The adjustment control module 314 includes an input connected to the CTRL bus 371, an input connected to the EV_C bus 382, and an input connected to the AD_C bus 381, and an output connected to the ADJ bus 372. The threshold compare module 340 includes an input connected to a CTR_DATA bus 373, an input connected to the CTRL bus 371 and an output (INT).

The address compare module 314 is configured to receive an instruction addresses via the I_AD bus 380, a data address via the D_AD bus 390, address ranges via the AD1 bus 374, the AD2 bus 375, the AD3 bus 376, and the AD4 bus 377 and match type configuration information via the CTRL bus 371. The address compare module 310 determines the relationship between the received addresses and the address ranges, depending on the match type for each address range, and provides information to the AD_C bus 381 indicating matches for each received address and address range. For example, the address compare module 310 can provide information indicating whether the received instruction address matches each of the received address ranges, and whether the received data address matches each of the received address ranges. In addition, the address compare module 310 can indicate different matches depending on the match type indicated by the received configuration information. For example, the address compare module 310 can indicate that the received instruction address falls outside of the first received address range and that the received data address falls within the second received address range.

The event compare module 312 is configured to receive a performance event type code via the PEI bus 370 and, based on the event type and configuration information received from the CTRL bus 371, provide information indicating which of the performance counters 212 is a candidate for adjustment. For example, the received configuration information can indicate that the performance counter 222 is a candidate for adjustment when a cache miss occurs. Accordingly, when a cache miss is indicated at the PEI bus 370, the event compare module provides information via the EV_C bus indicating that the performance counter 222 can be adjusted.

The adjustment control module 314 receives address comparison information via the AD_C bus 381 and information indicating performance counter adjustment candidates via the EV_C bus 382. Based on this information, and configuration information received via the CTRL bus 371, the adjustment control module 314 determines which of the set of performance counters 212 should be adjusted and provides information via the ADJ bus 372 to adjust the identified counters. For example, the AD_C bus 381 can indicate a match for a first address range, and the EV_C bus 382 can indicate that the performance counter 222 is a candidate for adjustment. The adjustment control module 314 consults the received configuration information to determine if the performance counter 222 should be adjusted when there is a match for the first address range, and provides the appropriate adjustment information to the ADJ bus 372.

The threshold compare module 340 receives counter data via the CTR_DATA bus 373. This counter data includes information about the values stored in each of the set of performance counters 212. The threshold compare module 340 compares the counter data to one or more thresholds received via the CTRL bus 371. In response to determining that one or more of the thresholds is exceeded, the threshold compare module generates an interrupt signal at the INT output.

Figure 4:
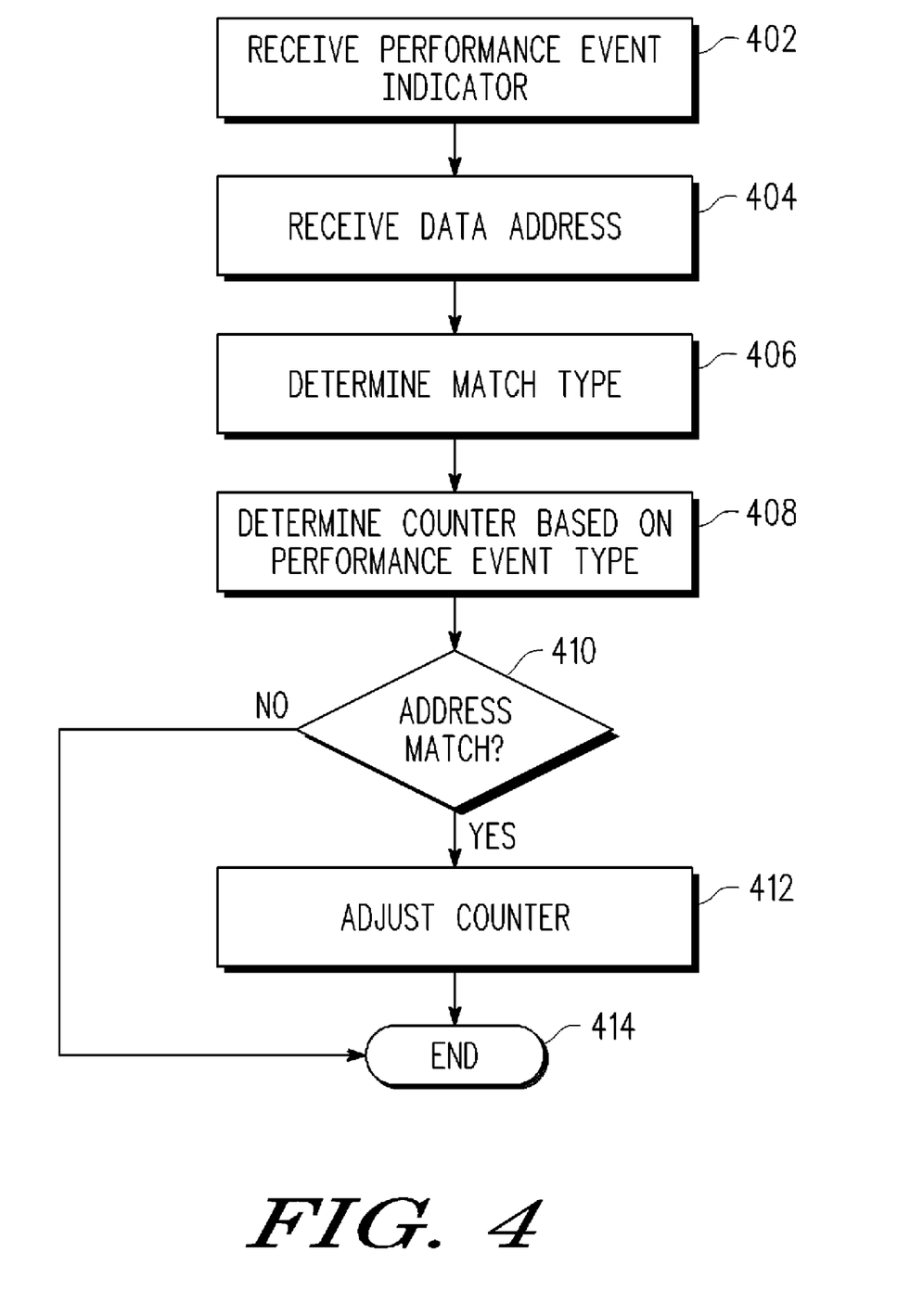
FIG. 4 is a flow diagram illustrating a particular embodiment a method of tracking performance events at a processor.

Referring to FIG. 4, a flow diagram of a particular embodiment of a method of monitoring performance events is illustrated. At block 402, a performance event indicator is received from a processor or other module of a processing device. The performance event indicator is received in response to execution of an instruction resulting in the performance event. Moving to block 404, a data address associated with the performance event is received. The data address is related to the instruction whose execution resulted in the performance event indicator.

The method flow moves to block 406 and a match type is determined. The match type refers to the type of relationship between the received data address and an address range. For example, the match type can represent an inclusive relationship in that the data address be within the address range in order to generate a match. Alternatively, the match type can represent an exclusive relationship in that the data address be outside the address range, or that the data address match an address exactly. Further, the match type can indicate whether the address range is inclusive or exclusive at the range boundary.

Proceeding to block 408, a counter is determined based on the performance event type indicated by the performance event indicator. The selected counter is associated with an address range. At decision block 410, it is determined whether the received data address matches the address range of the selected counter based on the match type determined at block 406. If not, the method flow moves to block 414 and the process represented by method 400 ends. If there is a match, the method flow proceeds to block 412 and the selected counter is adjusted. The method flow then moves to block 414 and the method ends. Accordingly, a counter associated with a performance event type is adjusted in response to a data address associated with the performance event matches an address range.

Figure 5:
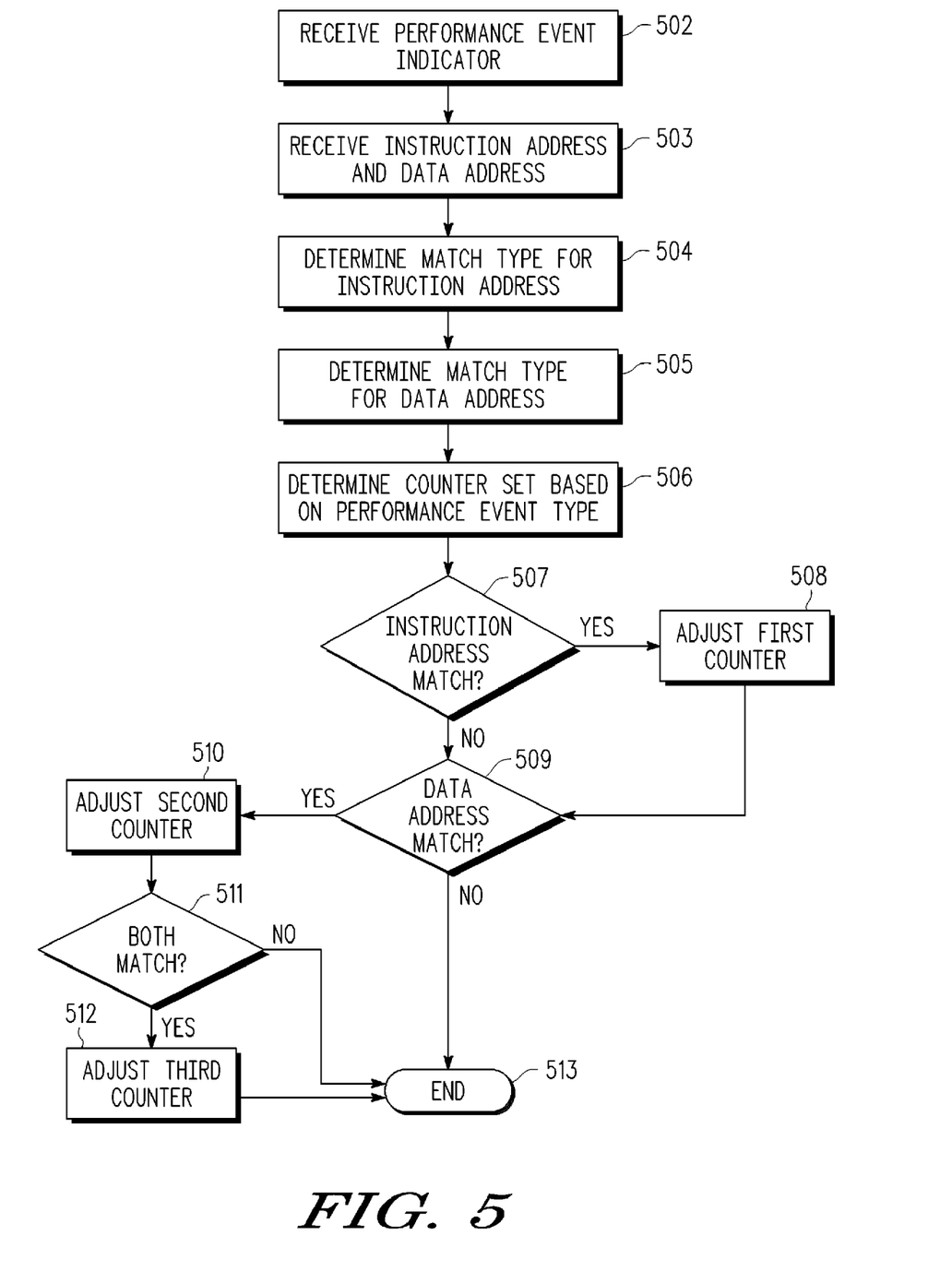
FIG. 5 is a flow diagram illustrating another particular embodiment of a method of tracking performance events at a processor.

Referring to FIG. 5, a flow diagram of a method of recording performance events is illustrated. At block 502, a performance event indicator is received from a processor or other module in response to execution of an instruction that causes a performance event. At block 503, an instruction address and data address associated with the instruction are received.

Proceeding to block 504, a match type for the instruction address is received and at block 506, a match type for the data address is determined. Each of the match types an be independent of the other. For example, the match type for the instruction address can indicate that, in order for a match to occur, the instruction address must fall outside of an address range, while the match type for the data address can indicate that a match occurs when the data address falls within an address range.

Moving to block 506, a set of performance counters is determined based on the type of performance event indicated by the performance event indicator. The method flow moves to block 507 and it is determined whether the received instruction address matches an address range associated with a first counter of the selected set of performance counters based on the match type determined at block 504. If there is no match, the method flow moves to block 509. If there is a match, the method flow moves to block 508 and the first performance counter in the selected set is adjusted. The method flow then moves to block 509.

At block 509, it is determined whether the received data address matches an address range associated with a second performance counter of the selected set. If not, the method flow moves to block 512 and the method ends. If there is a match, the method flow moves to block 510 and the second performance counter is adjusted. The method flow proceeds to block 511, and it is determined whether the instruction address matches an instruction address range associated with a third counter of the selected counter set. In addition, it is determined whether the data address matches a data address range associated with the third counter. If either the instruction address or data address do not match the respective address ranges, according to the respective match type, the method flow moves to block 513 and the method ends. If both the instruction address and data address match the respective address ranges the method flow moves to block 512 and the third counter is adjusted. The method flow proceeds to block 513 and the process represented by the method ends.

Figure 6:
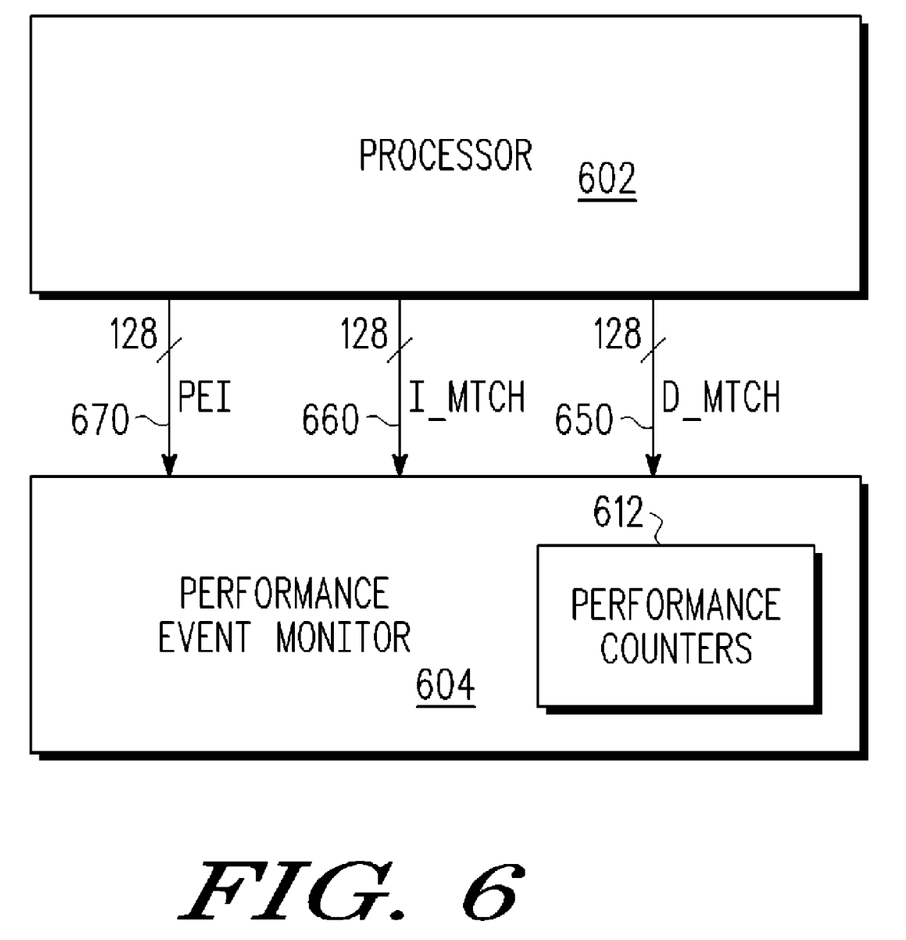
FIG. 6 is a block diagram of another particular embodiment of a data processing device.

Referring to FIG. 6, a block diagram of a particular embodiment of a data processing device 600 is illustrated. The data processing device 600 includes a processor 602 and a performance event monitor 604. The processor 602 is connected to the performance event monitor 604 through a number of data buses, including a performance event indicator data bus 670 labeled "PEI", an instruction address match bus 660 labeled "I_MTCH", and a data address data bus 650 labeled "D_MTCH."

The processor 602 can be a data processor, microprocessor, microcontroller, and the like, configured to execute computer instructions that result in performance events, such as cache hits, cache misses, TLB hits, and the like. An address, such as an instruction address, a data address, or both, is associated with each computer instruction and therefore is associated with any performance events that result from the instruction. The processor 602 is configured to indicate that a performance event has occurred by providing a performance event code at the PEI bus 670. In addition, the processor 602 indicates whether the instruction address matches an instruction address range by providing an instruction match code at the I_MTCH bus 660, and indicates whether the data address matches a data address range by providing a data match code at the D_MTCH bus 650.

The processor 602 can be configured to indicate that a performance event has occurred only under particular conditions. In a particular embodiment, the processor 602 is configured to indicate a performance event based the counting of a duration or usage event. For example, the processor 602 can be configured to indicate that a cache miss has occurred in response to a recovery from the cache miss exceeding a specified number of cycles.

The performance event monitor 604 is configured to decode a performance event code provided via the PEI bus 670 and to identify whether one or more of the performance counters 612 is associated with the performance event type indicated by the event code. The performance event monitor 604 is configured to adjust counters associated with the indicated performance event type depending on the codes provided at the I_MTCH 660 and D_MTCH bus 670. For example, the performance event monitor 604 can be configured to adjust a counter if the instruction match code and the data match codes both indicate a match.

During operation, the processor 602 provides performance event information to the performance event monitor 604 which records the number of performance events associated with a particular data address or instruction address. When a performance event occurs the processor 602 notifies the performance event monitor 604 via the PEI bus 670. In addition, the processor 602 indicates, via the I_MTCH bus 660 and D_MTCH bus 650, whether an instruction address data address associated with the performance event matches a particular addresses or address ranges.

The illustrated configuration allows for simultaneous recording of multiple performance events. For example, by providing a code at the PEI bus 670 indicating multiple performance events, together with providing match codes at the I_MTCH bus 660 and D_MTCH bus 650 indicating multiple address range matches, the processor 602 can indicate the occurrence of multiple performance events, as well as the match information for each of the performance events. The occurrence of the performance events associated with each address range can then be simultaneously recorded at the performance event monitor 604.

The performance event monitor 604 analyzes the received performance event indicator information and address match information and determines whether the indicated performance events should be recorded. The performance counters are used to record the number of performance events associated with a particular data address range or instruction address range. Accordingly, after a set of instructions has be executed, each of the performance counters 612 will indicate the number of one kind of performance event that occurred in response to execution of instructions associated with an instruction address range or that occurred in response to access of a data address range.

In this document, relational terms such as "first" and "second", and the like, may be used solely to distinguish one entity or action from another entity or action without necessarily requiring or implying any actual such relationship or order between such entities or actions. The terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "or" are intended to cover an inclusive "or" such that if both conditions of the "or" conditional are satisfied, then the conditional is satisfied. The term "range" can include a range that includes only a single value.

The term "another", as used herein, is defined as at least a second or more. The terms "including", "having", or any variation thereof, as used herein, are defined as comprising. The term "coupled", as used herein with reference to electro-optical technology, is defined as connected, although not necessarily directly, and not necessarily mechanically.

As used herein, the term "bus" is used to refer to a plurality of signals or conductors that may be used to transfer one or more various types of information, such as data, addresses, control, or status. The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Other embodiments, uses, and advantages of the disclosure will be apparent to those skilled in the art from consideration of the specification and practice of the disclosure disclosed herein. For example, although the performance event monitoring techniques disclosed herein have been discussed with respect to a single processor, similar techniques could be employed for devices having multiple processor cores. Each processor core could be associated with a different performance event monitor or each performance event monitor of a device could be associated with multiple processor cores. The specification and drawings should be considered exemplary only, and the scope of the disclosure is accordingly intended to be limited only by the following claims and equivalents thereof.

What is claimed is:

1. A method, comprising:
receiving a first performance event indicator associated with a first instruction;
receiving a first data address associated with the first performance event indicator; and
adjusting a first counter based on the first performance event indicator, based on a relationship between the first data address and a first criterion, and based on a relationship between a first instruction address associated with the first instruction and a second criterion.

2. The method of claim 1, wherein the first criterion comprises a first address range and the second criterion comprises a second address range and adjusting the first counter comprises adjusting the first counter in response to the first instruction address being within the first address range and the first data address being within the second address range.

3. The method of claim 1, wherein the first criterion comprises a first address range and a second address range and the second criterion comprises a third address range and wherein adjusting the first counter comprises adjusting the first counter in response to the first instruction address being within the first address range or the second address range and the first data address being within the third address range.

4. The method of claim 1, wherein the first criterion comprises a first address range and the second criterion comprises a second address range and a third address range and wherein adjusting the first counter comprises adjusting the first counter in response to the first instruction address being within the first address range and the first data address being within the second address range or the third address range.

5. The method of claim 1, wherein the first criterion comprises a first address range and a second address range and the second criterion comprises a third address range and a fourth address range and wherein adjusting the first counter comprises adjusting the first counter in response to the instruction address being within the first address range or the second address range and the data address being within the third address range or the fourth address range.

6. The method of claim 1, further comprising:
receiving a second performance event indicator associated with a second instruction; and
adjusting a second counter based on the second performance event indicator, a relationship between a second instruction address associated with the second instruction and a third criterion, and the relationship between a second data address associated with the second instruction and a fourth criterion.

7. The method of claim 6, wherein the first criterion comprises a first address range, the second criterion comprises a second address range, the third criterion comprises a third address range, and the fourth criterion comprises a fourth address range, and wherein adjusting the first counter comprises adjusting the first counter in response to the first instruction address being within the first address range and the first data address being within the second address range; and wherein adjusting the second counter comprises adjusting the second counter in response to the second instruction address being within the third address range and the first data address being within the fourth address range.

8. The method of claim 6, wherein the first criterion comprises a first address range, the second criterion comprises a second address range, the third criterion comprises the first address range, and the fourth criterion comprises a third address range, and wherein adjusting the first counter comprises adjusting the first counter in response to the first instruction address being within the first address range and the first data address being within the second address range, and wherein adjusting the second counter comprises adjusting the first counter in response to the second instruction address being within the first address range and the first data address being within the third address range.

9. The method of claim 6, wherein the first criterion comprises a first address range, the second criterion comprises a second address range, the third criterion comprises a third address range, and the fourth criterion comprises the second address range, and adjusting the first counter comprises adjusting the first counter in response to the first instruction address being within a first address range and the first data address being within a second address range; and
wherein adjusting the second counter comprises adjusting the first counter in response to the second instruction address being within a third address range and the first data address being within the second address range.

10. The method of claim 1, further comprising generating an interrupt signal based on a relationship between a value stored in the first counter and a threshold.

11. The method of claim 1, wherein the first performance event indicator is representative of an instruction processing performance event.

12. The method of claim 1, wherein the first performance event indicator is representative of a branch related performance event.

13. A device, comprising:
a processor;
a first register configured to store a first address range;
a second register configured to store a second address range;
a control module comprising;
a first input configured to receive an indicator of a first performance event of the processor, the performance event associated with an execution of first instruction by the processor; and
a first output configured to provide a first adjustment indicator signal based on the indicator of the first performance event, an instruction address associated with the first instruction, a data address associated with the instruction, the first address range, and the second address range; and
a first counter comprising an input coupled to the first output of the control module, the first counter configured to adjust a stored value based on the first adjustment indicator signal being in a first select state.

14. The device of claim 13, wherein the control module is configured to place the first adjustment indicator signal in the first select state in response to the instruction address being within the first address range and the data address being within the second address range.

15. The device of claim 13, wherein the control module is configured to place the first adjustment indicator signal in the select state in response to the instruction address being outside of the first address range and the data address being within the second address range.

16. The device of claim 13, further comprising:
a third register configured to store a third address range;
a fourth register configured to store a fourth address range; and
wherein the control module further comprises a fourth input coupled to the output of the third register and a fifth input coupled to the output of the fourth register.

17. The device of claim 16, wherein the control module is configured to place the first adjustment indicator signal in the select state in response to the instruction address being within the first address range or the second address range and the data address being within the third address range.

18. The device of claim 16, wherein the control module is configured to place the first adjustment indicator signal in the select state in response to the first instruction address being within the first address range and the first data address being within the second address range or the third address range.

19. The device of claim 16, wherein the control module comprises a second output configured to provide a second adjustment indicator based on an indicator of a second performance event, an instruction address associated with a second instruction, a data address associated with the second instruction, the third address range, and the fourth address range and further comprising:
a second counter comprising an input coupled to the second output of the control module, the second counter configured to adjust a stored value based on the second adjustment indicator signal being in a second select state.

20. The device of claim 19, wherein the control module is configured to place the first adjustment indicator signal in the first state in response to the first instruction address being within the first address range and the first data address being within the second address range;
and is configured to place the second adjustment indicator in the second state in response to the second instruction address being within the third address range and the second data address being within the fourth address range.

* * * * *